United States Patent
Wey

(10) Patent No.: US 9,455,581 B2
(45) Date of Patent: Sep. 27, 2016

(54) SAFETY-CRITICAL SMART BATTERY MANAGEMENT SYSTEM WITH THE CAPABILITY OF CHARGING SINGLE BATTERY CELLS AND DISCHARGING BATTERY PACK

(71) Applicant: Chin-Long Wey, Hsinchu (TW)

(72) Inventor: Chin-Long Wey, Hsinchu (TW)

( * ) Notice: Subject to any disclaimer, the term of this patent is extended or adjusted under 35 U.S.C. 154(b) by 289 days.

(21) Appl. No.: 14/458,267

(22) Filed: Aug. 13, 2014

(65) Prior Publication Data

US 2015/0048799 A1 Feb. 19, 2015

(30) Foreign Application Priority Data

Aug. 14, 2013 (TW) .............................. 102129104 A
Jul. 24, 2014 (TW) .............................. 103125414 A

(51) Int. Cl.
*H02J 7/00* (2006.01)
*H01M 10/42* (2006.01)
*H01M 2/20* (2006.01)

(52) U.S. Cl.
CPC ........ *H02J 7/0026* (2013.01); *H01M 10/4207* (2013.01); *H02J 7/0032* (2013.01); *H01M 2/202* (2013.01); *H02J 7/0013* (2013.01); *H02J 7/0021* (2013.01); *Y02T 10/7055* (2013.01)

(58) Field of Classification Search
CPC .... H01M 10/05; H01M 2/202; H02J 7/0013; H02J 7/0021; H02J 7/0026
USPC ........ 320/107, 112, 116–118, 121, 124, 126, 320/134–137
See application file for complete search history.

(56) References Cited

U.S. PATENT DOCUMENTS

| | | | | |
|---|---|---|---|---|
| 2007/0210760 | A1* | 9/2007 | Shimamura | H01M 2/1077 320/135 |
| 2013/0187616 | A1* | 7/2013 | Chuang | H01M 10/44 320/136 |
| 2013/0320930 | A1* | 12/2013 | Suzuki | H01M 10/482 320/134 |

* cited by examiner

*Primary Examiner* — Paul Dinh
(74) *Attorney, Agent, or Firm* — Chih Feng Yeh; Huntington IP Consulting Co., Ltd.

(57) ABSTRACT

A safety-critical smart battery management system with the capability of charging single battery cells and discharging battery pack, which comprises smart battery pack, a smart battery charging module and a smart battery discharging module. In the smart battery pack, many cells in a battery group are charged separately at a time. The smart battery discharging module is used to discharge the smart battery pack, so as to achieve the efficacy of a promoted charging efficiency, an increased overall energy source efficiency, and a prolonged battery lifetime. The mechanism has plugging and automatic electric disconnection. Whenever a safety issue or a not-in-use state presents, the smart battery discharging module may be automatically separated with a load. The cells may be avoided from a self-discharging, which successively causes fire catching and thus an explosion and adversely affects a lifetime of the cells, thereby promoting a safety and reliability of the battery system.

20 Claims, 14 Drawing Sheets

SAFETY-CRITICAL SMART BATTERY MANAGEMENT SYSTEM WITH THE CAPABILITY OF CHARGING SINGLE BATTERY CELLS AND DISCHARGING BATTERY PACK

CROSS-REFERENCE TO RELATED APPLICATION

The application claims the benefit of TAIWAN Patent Application Serial Number 102129104 and 103125414, filed on Aug. 14, 2013 and Jul. 24, 2014 respectively, which are herein incorporated by reference.

BACKGROUND OF THE RELATED ART

1. Technical Field

The present invention relates to a battery management system, and particularly to a safety-critical smart battery management system with the capability of charging single battery cells and discharging battery pack.

2. Related Art

Batteries have been widely employed in green electronics, recycle energy source, electric vehicles, mobile electronic/electric products and power supplies industries. However, a high volume lithium battery contains inflammable and explosive chemical components, some fire catching and thus explosion cases have arisen due to it unstable structure. This safety regulations associated with the battery has drawn respects from the industry and government.

FIG. 1 is a schematic diagram of an embodiment of a prior art battery pack. As shown, a battery pack 10 is formed by separate battery group 20 connected in series, in which two adjacent cells, or termed as a battery cell, are connected through a connection sheet 14, i.e. a positive electrode 12 of a battery and a negative electrode 13 of another battery are connected through a connection sheet 14. Connection pins (15, 16) of the positive and negative electrodes are connected to a load to discharge, while connected to a charger to charge.

Generally, the lithium cell has a voltage ranged between 3.3V to 3.6V, while a lithium battery pack having a plurality of lithium cells connected in series has a voltage ranged between 30V to 45V. To drive a hybrid electric vehicle, a direct current (DC) voltage of up to 450V is required, i.e. over ten lithium cell is required.

To efficiently use such huge lithium cells, the ability for the smart battery management has to be possessed, to promote an efficiency and stability of charging and discharging. As such, the load or electronic product under operation may work stably without being interfered and the battery may be promoted with its high charging efficiency and prolonged with it lifetime.

When only a lithium cell charges and discharges, it has the advantages including a highest multiplication, a consistent internal resistance, an exemption of any balance issue, a rapid heat dissipation efficiency, and a longest lifetime. However, when the battery cells are connected in series, the separate cells may have the inconsistency issue in their voltage, electric amount and internal resistance.

When the individual cells in parallel have different voltages, the individual cells may charge and discharges mutually.

When the individual cells in parallel do not comply with one another, some cells may be caused to overly discharge or charge. When the individual cells in parallel does not equal to one another, in their internal resistance, some cells may be larger in their output currents forever, while the output currents of some cells have their smaller currents forever. The above condition does not only affect the charging efficiency and the lifetime of the cells, an explosive danger might occur. Therefore, in the North America UL safety regulations, UL1642 (a safety test for the cell) and UL2580 (safety test for vehicle lithium cell) have their substantially same mechanical and environmental test requirement. However, in the electric test, the UL2580 test for the battery cells has a much more complicated requirement than that for the UL1642 test. Hence, the smart battery management system capable of single charging and multi-discharging not only has the above advantage, but also satisfies the UL safety regulations.

For the prior art battery cell, the charging/discharging mechanism may not have the single charging function (each battery cell is charged singly), since the cells in the battery cell has form the battery cell through the connection sheet 14 welded electrically (through an in-series or in-parallel fashion). In the course of charging, the cells having been electrically welded may not be separately charged. When the load or electronic product is under a shut-down state or in an improper use state, i.e. encounters a safety issue, the prior art battery system still has a connection with the load or electronic product, the battery cells are caused to self discharge and thus cause an explosion, which successively affects the lifetime of the cells and the safety and reliability of the battery system.

In view of this issue, TW patent I398068 has set forth a technology to avoid the above issue, as is shown in FIG. 2. FIG. 2 is a schematic diagram of a prior art battery management system with a unified charging and discharging capability and a programmable battery management module thereof. In this patent, a universal loop 25 is employed to change a connection relationship between the cells 26a-26d and, the charging module 27 and the discharging module 28, so that some cells in the battery module 26 are caused to discharge while the other cells charge simultaneously, which further prolongs a lifetime of the battery module 26.

However, for the purpose of a flexible change, the universal loop 25 is implemented by an electronic switch. When a plurality of cells are connected in series, the electronic switch under use has to have a larger high-voltage, a high-current, and a heat enduring features. At this time, the control unit 29 may have an abruptly increased design complexity. Therefore, since the electronic switch has its upper limit for such features, the above manner still cannot effectively solve the poor charging efficiency and battery lifetime issues.

In view of the above, it may be known that there has long been a to-be-improved issue on charging efficiency, battery cell lifetime, and safety. Therefore, there is quite a need to set forth an improvement means to settle down this problem.

SUMMARY

The present invention discloses a safety-critical smart battery management system with the capability of charging single battery cells and discharging battery pack. In the course of charging, each of the plurality of cells may be singly charged, and the cells may be measured with its characteristics and conditions. As such, the advantage of single cell charging may be achieved, thereby further improving a charging efficiency of the smart battery pack, prolonging a cell lifetime, and satisfying UL safety regulations. In addition, the smart battery discharging module is employed to discharge the smart battery pack, so that the conditions of the cells may be monitored and measured to obtain a better discharging use rate, thereby promoting the overall energy source efficiency of the smart battery pack. Whenever a load or electronic product is in a shut-down state or in an improper use, the smart battery discharging module may automatically disconnect a connection, so as to avoid from a self charging and discharging of the battery cells and successively fire catching and an explosion.

In short, the safety-critical smart battery management system with the capability of charging single battery cells and discharging battery pack is a such system charging a single battery core and discharging the smart battery pack (the plurality of cells). For the former, the charging efficiency of the smart battery charging module is increased, the lifetime of the cells is prolonged, and the system is enable to further satisfy the UL regulations. For the latter, the overall energy source of the smart battery pack is promoted. In addition, the high safety of the system originates from the automatic separation function between the smart battery discharging module and the load or electronic product.

To achieve the above efficacies, the present invention provides a safety-critical smart battery management system with the capability of charging single battery cells and discharging battery pack comprising a smart battery pack, comprising a battery group, comprising a plurality of cells, exempting from any electrical connection thereamong; a battery connection module, simultaneously arranged at a first side and a second side or one of the first and second sides, and having a plurality of pins exempting from a conduction to one another and electrically connected to a positive electrode and a negative electrode; and a monitoring control unit, monitoring and measuring a charging and discharging state and characteristics of the plurality of cells in the battery group; a smart battery charging module, comprising a battery charging connection module, electrically connected to or disconnected to the plurality of pins of the battery connection module through a plugging manner, and enabling the plurality of cells in the battery group to connect to one another in series-parallel when electrically connected to the plurality of pins of the battery connection module; and a smart battery charging control unit, electrically connected to the battery charging connection module, and charging each single one of the plurality of cells in the battery group; and a smart battery discharging module, electrically connected to or disconnected to the plurality of pins of the battery connection module through a plugging manner, enabling the plurality of cells in the battery group to connect to one another in series-parallel and discharge when electrically connected to the plurality of pins of the battery connection module, and automatically disconnecting the electrical connection between the smart battery discharging module and the plurality of pins when a load is stopped in use.

According to the present invention, the safety-critical smart battery management system with the capability of charging single battery cells and discharging battery pack comprises a smart battery pack, comprising a battery group, comprising a plurality of cells, exempting from any electrical connection thereamong; a battery connection module, simultaneously arranged above or below the battery group to electrically connect the battery; and a monitoring control unit, monitoring and measuring a charging and discharging state and characteristics of the plurality of cells in the battery group; a monitoring control unit, monitoring and measuring a charging and discharging state and characteristics of the plurality of cells in the battery group; a smart battery charging module, comprising a battery charging connection module, electrically connected to or disconnected to the plurality of pins of the battery connection module through a plugging manner, and enabling the plurality of cells in the battery group to connect to one another in series-parallel when electrically connected to the plurality of pins of the battery connection module; and a smart battery charging control unit, electrically connected to the battery charging connection module, and charging each single one of the plurality of cells in the battery group; and a smart battery discharging module, comprising a battery discharging connection module, electrically connected to or disconnected to the battery connection module through a plugging manner and discharging the plurality of cells in the battery group in series-parallel when electrically connected to the battery connection module.

By means of implementation of the present invention, at least the following efficacies may be achieved.

1. By using the smart battery management system capable of single charging and multi-discharging with high safety, each one of the plurality of cells in the battery group may be singly charged to increase a charging efficiency of the smart cells and prolong a lifetime of the cells.

2. By using the smart battery management system capable of single charging and multi-discharging with high safety, the smart battery pack (the plurality of cells) is caused to discharge to promote an overall energy efficiency of the smart battery pack.

3. By means of the smart battery pack, each of the plurality of cells is jointly or separately connected to a monitoring/measurement device, to monitor and measure the charging and discharging state and characteristics of each of the plurality of cells in the battery group, to further promote an energy charging and discharging efficiency. Since each of the smart battery pack includes the memory for storing data therein, it may be used in any smart battery charging module to save a cost required by the chargers.

4. By using the advantages of the single battery core charging, a battery balance action may be simplified or omitted, which benefits a compliance with UL safety regulations.

5. The smart battery discharging module and the smart battery pack are connected to discharge. In the smart battery discharging module, its connection points are the contacts of the smart battery pack for external connection, but not directly welded onto the cells through a connection sheet used in the prior art (as shown in FIG. 1). Therefore, the battery core in the battery group may have a promoted recycle value. The battery connection module, the battery charging connection module, and the smart battery discharging module may be implementation in a PCB having a suitable form and material, making the possibility of automatic manufacturing of the battery cell, and further promoting a production efficiency and reducing a manufacturing cost.

6. The smart battery discharging module is electrically connected or disconnected to the smart battery pack in a hot plugging manner. When the load or an electronic product is exempted from a use together, the smart battery pack is separated with the smart battery discharging module in a mechanical or electrical manner, enabling each of the plurality of cells in the battery group to have no any connection, so as to avoid the battery cell to self charge and discharge to catch a fire and thus explode, thereby reinforcing a safety of the cells.

BRIEF DESCRIPTION OF THE DRAWINGS

The present invention will be better understood from the following detailed descriptions of the preferred embodi

DETAILED DESCRIPTION

The present invention will be apparent from the following detailed description, which proceeds with reference to the accompanying drawings, wherein the same references relate to the same elements.

Figure 3:
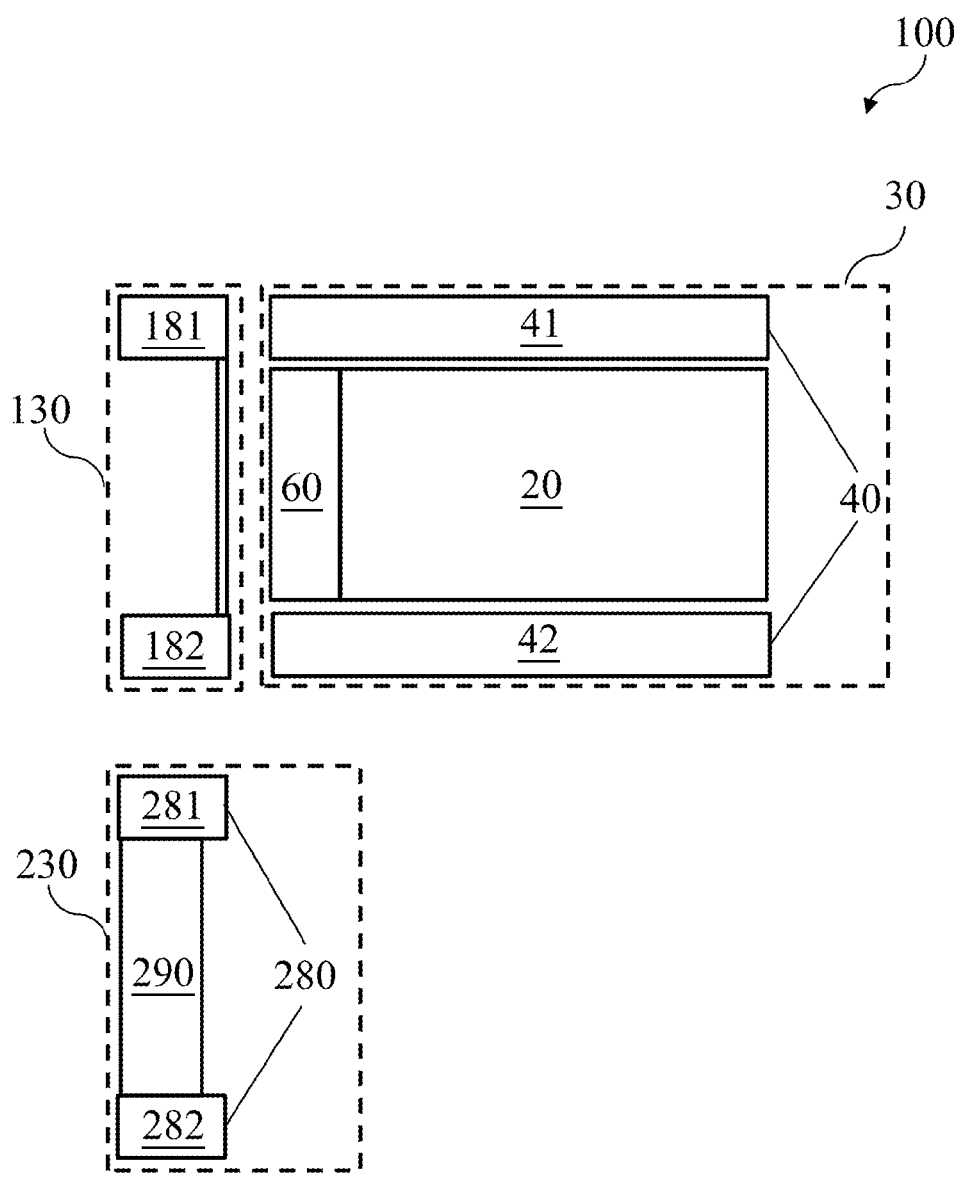
FIG. 3 is a schematic diagram of a circuit block embodiment of a safety-critical smart battery management system with the capability of charging single battery cells and discharging battery pack according to the present invention.

Referring to FIG. 3, a schematic diagram of a circuit block embodiment of a safety-critical smart battery management system with the capability of charging single battery cells and discharging battery pack according to the present invention is shown. The smart battery management system 100 includes a smart battery pack 30, a smart battery discharging module 130 and a smart battery charging module 230. The smart battery pack 30 may be disposed in the smart battery discharging module 130 and the smart battery charging module 230 through a plugging manner. The smart battery pack 30 includes a battery group 20, a battery connection module 40 and a monitoring control unit 60.

Figure 1:
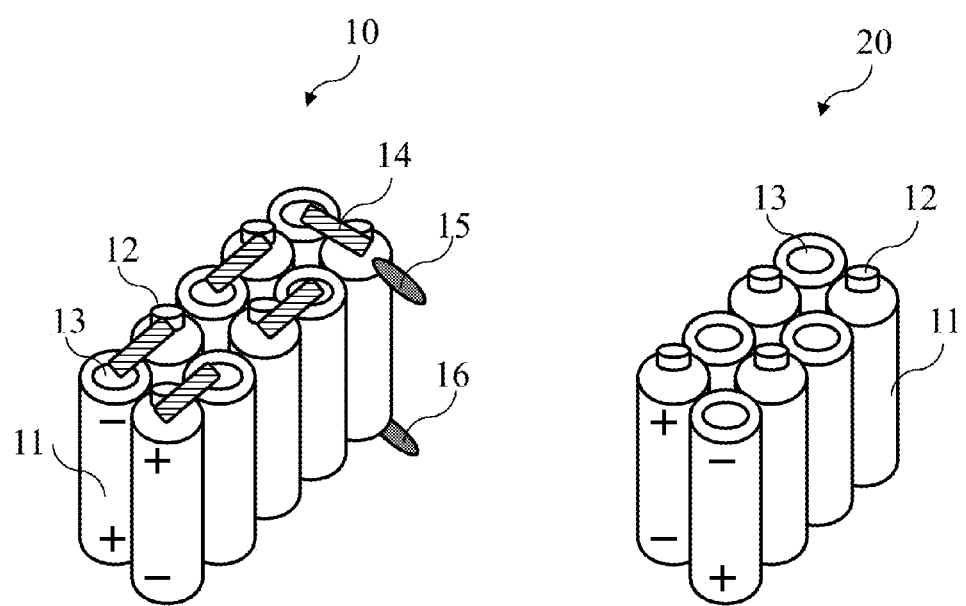
- FIG. 1 is a schematic diagram of an embodiment of a prior art battery cell.
Figure 2:
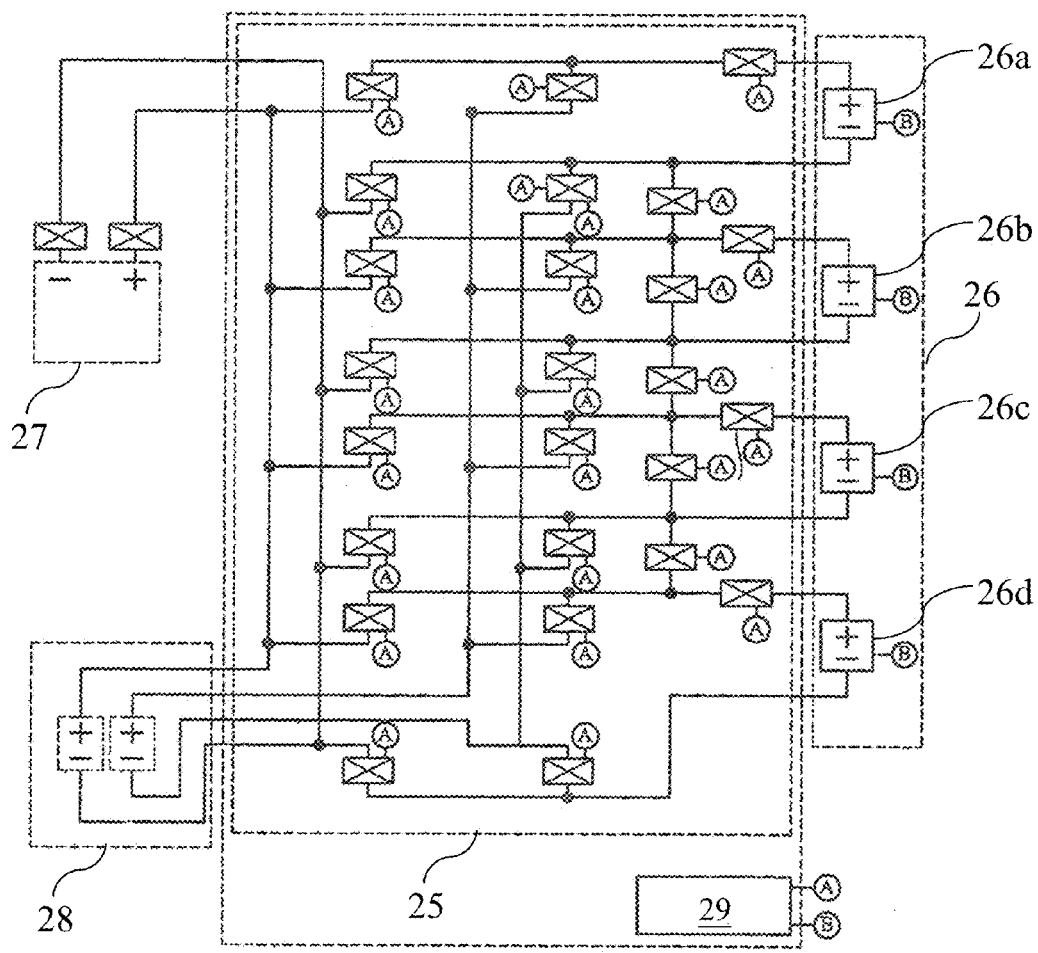
FIG. 2 is a schematic diagram of a prior art battery management system with a unified charging and discharging capability and a programmable battery management module thereof.

The battery group 20 at least includes two cells without any electric connection among the cells. In the battery group, the positive and negative electrodes may be disposed at two sides, an upper and lower sides schematically shown in FIG. 1, and at the same side. In the following, the description is stated based on the battery core architecture shown in FIG. 1. On the battery connection module 40, a side is called the battery connection module face A 41, and the other side is called the battery connection module face B 42. In real implementation, the battery connection module 40 may be implemented by using a pair of first printed circuit boards (PCBs) having a plurality of connection heads. This pair of first PCBs has two portions: the battery connection module face A 41 and the battery connection module face B 42, which are electrically connected with the cells. In real implementation, the battery connection module 40 may provide a plurality of contacts, so that each of the cells is connected to a monitoring/measurement device 61 of the monitoring control unit 60, respectively, so that a charging/discharging state and characteristics of each of the plurality of cells in the battery group 20 may be monitored and measured.

At the smart battery discharging module 130, it includes the smart battery discharging module face A 181 and the smart battery discharging module face B 182, which are electrically connected to the battery connection module face A 41 and the battery connection module face B 42. At the smart battery charging module 230, it comprises the battery charging connection module 280 and the smart battery charging control unit 290. The battery charging connection module 280 is electrically connected to the battery connection module face A 41 and the battery connection module face B 42.

The battery charging connection module 280 may be implemented by using a pair of first printed circuit boards (PCBs) having a plurality of connection heads. This pair of first PCBs has two portions: the battery charging connection module face A 281 and the battery charging connection module face B 282, which are electrically connected with the battery connection module face A 41 and the battery connection module face B 42 through a plugging manner, so that the cells of the battery group 20 are connected in series-parallel.

Figure 4:
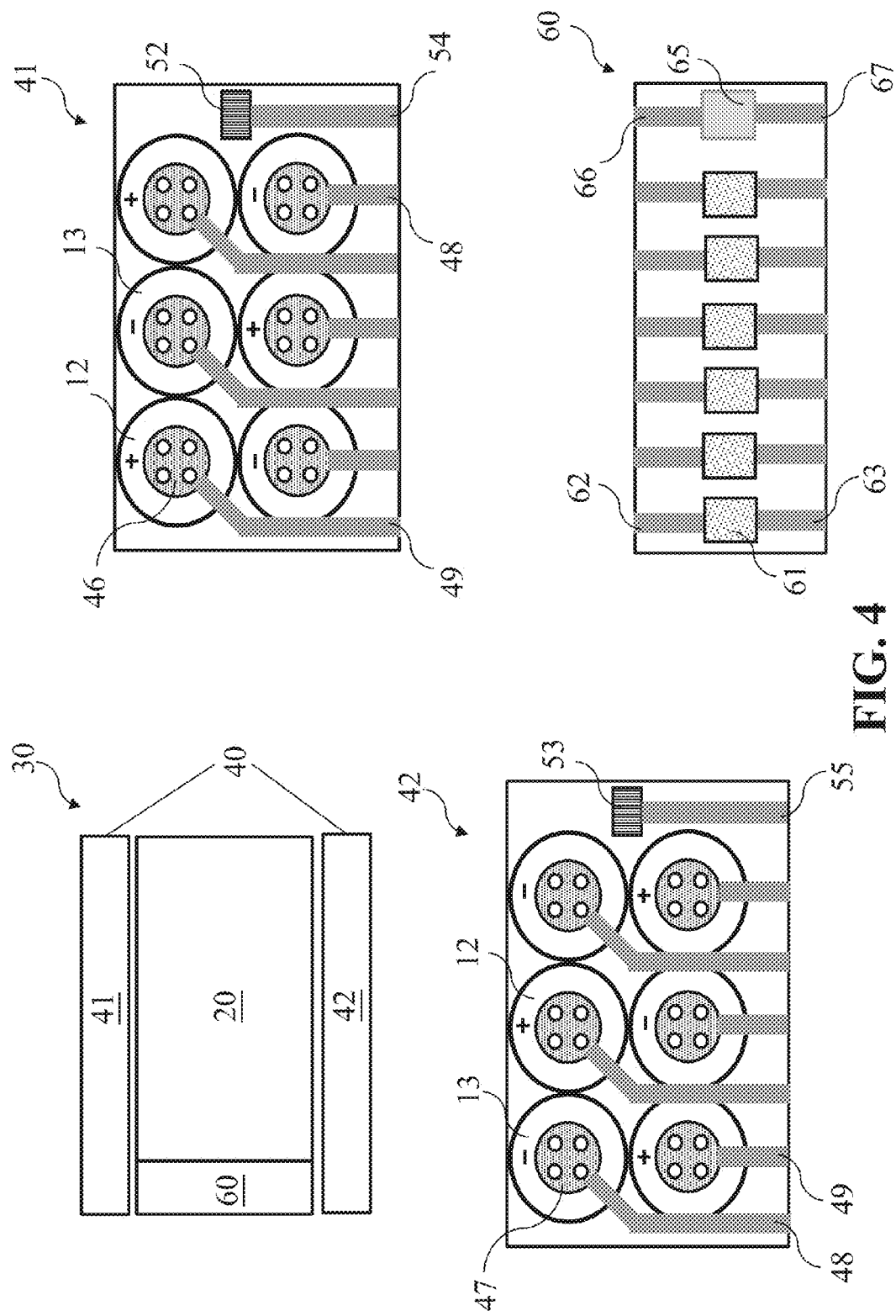
FIG. 4 is a schematic diagram of an embodied aspect of the safety-critical smart battery management system with the capability of charging single battery cells and discharging battery pack according to the present invention.

As shown in FIG. 4, a schematic diagram of an embodied aspect of the safety-critical smart battery management system with the capability of charging single battery cells and discharging battery pack according to the present invention. The smart battery pack 30 comprises a battery group 20 composed of a plurality of cells 11, a battery connection module 40, a monitoring control unit 60. In real implementation, the battery connection module 40 may be implemented by a PCB with a suitable form and material, such as a copper baseboard, a soft PCB, and a soft and hard composite baseboard.

The PCB has a plurality of connection pins (48, 49) not conducting to one another, and each of the connection pins (48, 49) has two ends, each may be a connection head (46, 47), which may be called as contacts as well. In the battery group 20, at positions corresponding to each of the cells 11, a connection head 46 is added, respectively, to form the battery connection module face A 41. Similarly, in the battery group 20, positions corresponding to each of the plurality of cells 11 is added with a connection head 47, to from the battery connection module face B 42. It is to be particularly pointed out that, the connection head (46, 47) may have other possible forms. For example, the other end of the connection head of the connection pins (48, 49) may be implemented by a magnetic connection head and disposed at an edge side of the PCB.

In addition, the battery connection module face A 41 and the battery connection module face B 42 are connected to the battery group 20, respectively, and may be electrically connected to the battery charging connection module 280 or the smart battery discharging module 130 through a plugging manner.

Each pair of connection heads is connected to the battery connection module face A 41 and the battery connection module face B 42 are connected to two pins (62, 63) of a monitoring/measurement device 61, respectively. It may also possible to share a common monitoring/measurement device 61 for a plurality of pairs of connection heads.

The monitoring/measurement device 61 of the monitoring control unit 60 may also be partially or entirely moved to the connection pins (48, 49) of the PCB near the battery connection module face A 41 and the battery connection module face B 42, so as to reduce a signal interference to enhance a measurement accuracy. When a partiality or entirety of the monitoring/measurement device 61 moves to near the connection head, it may be possible to use jointly uses one of such monitoring/measurement device 61.

In addition, the battery connection module face A 41 may also be added with one or more memories, such as the memory 52. The memory 52 is connected to the control circuit 65 via its connection pins 54 and the connection pins 66 of the control circuit, so that the control circuit may control the memory 52. Or, the battery connection module face B 42 may be added with one or more memories, such as the memory 53. The memory 53 is connected to the control circuit 65 through the connection pins 55 and the connection pins 67 of the control circuit, so as to control the memory 53 by the control circuit 65. Or, the battery connection module 42 may be added with the memories at its two sides concurrently, so as to record the identification and characteristics specification, the monitoring and measurement data during the charging and discharging period, and conditions for reaching the optimal charging and discharging state of the cells, and the like, to form the smart battery pack 30. The data stored in the memory (52, 53) of the smart battery pack 30 provides an efficient discharging and charging action for the smart battery discharging module 130 and smart battery charging module 230. In addition, since the memory (52, 53) is included in the smart battery pack 30, any smart battery charging module 230 may be used to be charged. That is, a smart battery charging module 230 may be used jointly with one or more smart battery pack 30, to save the requirement of chargers.

Figure 5:
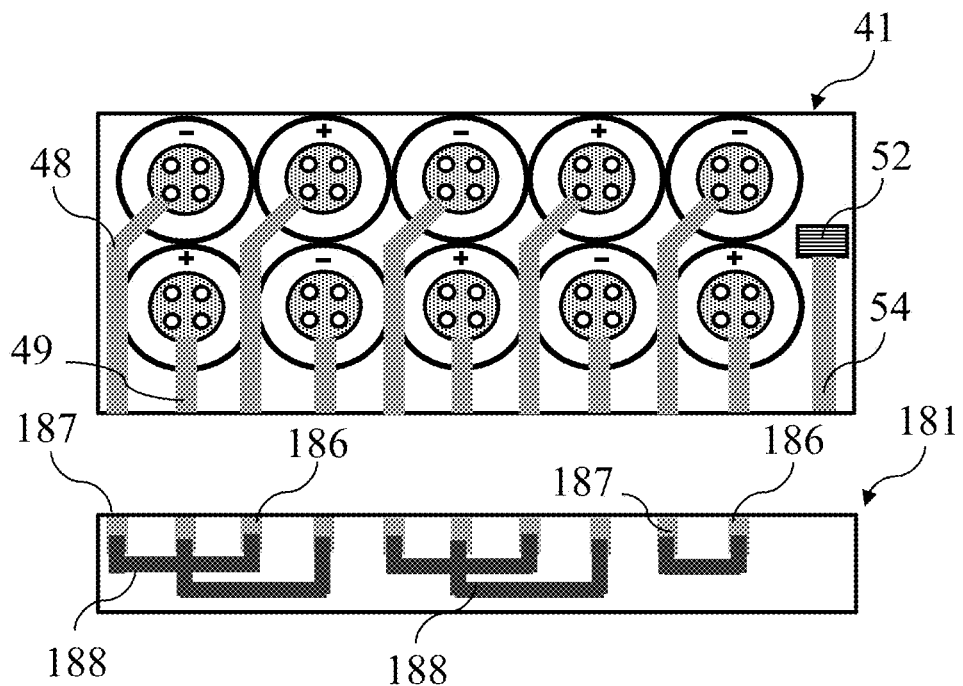
FIG. 5 is a schematic diagram of another embodied aspect of the safety-critical smart battery management system with the capability of charging single battery cells and discharging battery pack according to the present invention.
Figure 5:
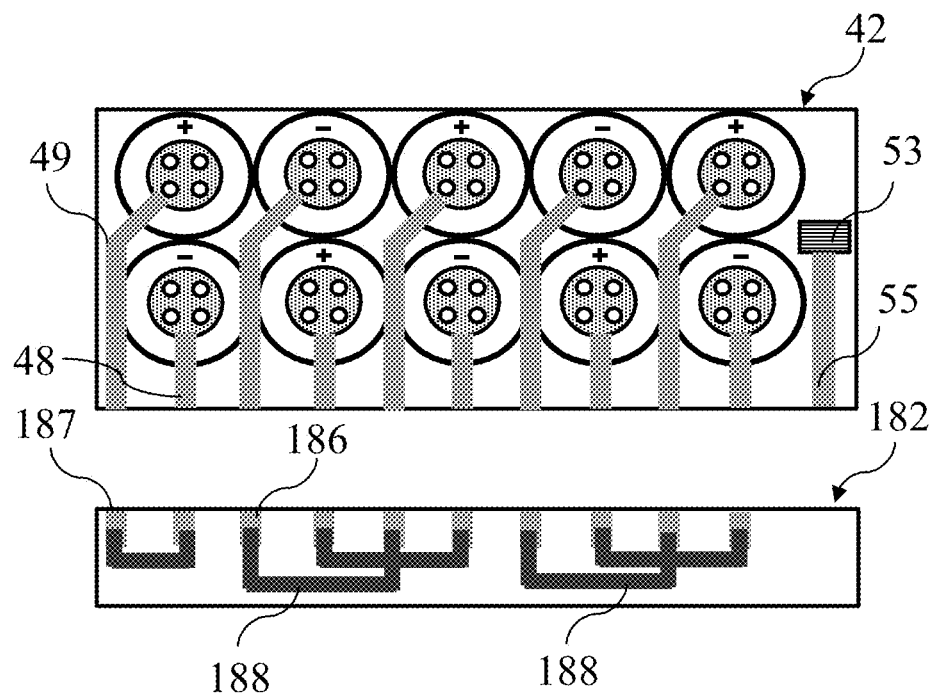

As shown in FIG. 5, a schematic diagram of another embodied aspect of the safety-critical smart battery management system with the capability of charging single battery cells and discharging battery pack according to the present invention is shown. In the course of battery discharging, the smart battery discharging module face A 181 and the smart battery discharging module face B 182 connect to a smart battery pack 30. The smart battery discharging module face A 181 includes the connection pins (186, 187) of a plurality of discharging module and routings connected in series-parallel. In real implementation, the smart battery discharging module face A 181 may be implemented by a PCB, and includes all connection pins (186, 187) and connection routings 188. According to an arrangement of the cells 11 and a requirement of the battery pack 10 with a "five in-series and two in-parallel" state of the battery group 20 shown in FIG. 1, a connection sheet 14 is used to connect the adjacent cells 14, for achieving the same purpose of the connection sheet 14. Similarly, face B of the smart battery discharging module includes a plurality of connection pins (186, 187) of the discharging module and routings 188 connected in series-parallel. The smart battery discharging module 130 has a similar discharging function as compared to the prior art battery pack. However, when the smart battery discharging module 130 is combined with the smart battery pack 30, it has intelligence and function of monitoring and measurement, thereby promoting an overall energy source efficiency of the smart battery pack 30.

The smart battery discharging module 130 may be implemented with a PCB with a suitable form and material, enhancing a possibility of automatic production of the battery assembly, thereby further promoting a production efficiency and reducing a manufacturing cost. In addition, the same smart battery pack 30 may be used repeatedly with different loads or electronic products, as long as the connected smart battery discharging module 130 have different routings 188. The routings on the connection pins (186, 187) of the discharging module may be electrically welded or controlled by a switch. In the case of switch control, this smart battery discharging module 130 has the characteristics of on-line re-assembly to produce different currents/voltages for the load or electronic product.

Figure 6:
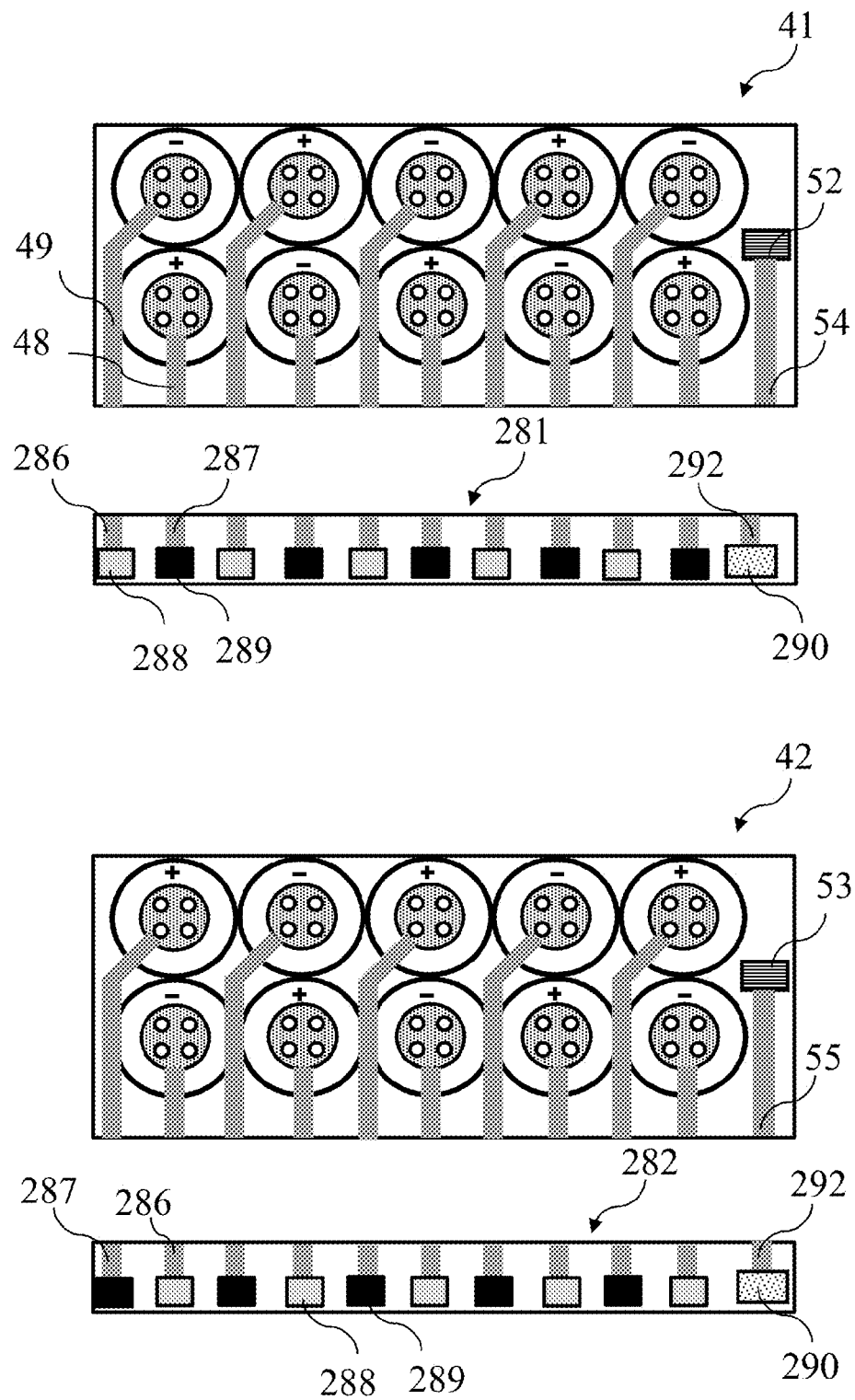
FIG. 6 is a schematic diagram of yet another embodied aspect of the safety-critical smart battery management system with the capability of charging single battery cells and discharging battery pack according to the present invention.

As shown in FIG. 6, a schematic diagram of yet another embodied aspect of the safety-critical smart battery management system with the capability of charging single battery cells and discharging battery pack according to the present invention is shown therein.

In the course of battery charging, the battery charging connection module face A 281 and the battery charging connection module face B 282 are connected to a smart battery pack 30. In real implementation, the battery charging connection module face A 281 may be implemented by a PCB, on which connection heads (286, 287) and connection wires are included, so that the connection heads (286, 287) is connected to the smart battery chargers (288, 289) to charge a cell singly. And comprises the smart battery charging control unit 290 and connection pins 292 thereof.

The battery charging connection module face B 282 may also be implemented in the same manner. That is, each pair of connection heads (286, 287) at the battery charging connection module face A 281 and the battery charging connection module face B 282 is connected to two ends of the smart battery chargers (288, 289), respectively. It may also be possible to share a common smart battery charger (288, 289) for a plurality pairs of connection heads. In implementation, a partiality or entirety of the smart battery chargers (288, 289) may also be moved to the connection head of the PCB near the battery charging connection module face A 281 or the battery charging connection module face B 282, so as to reduce a connection wire resistance issue and thus increase a charging efficiency. When a partiality or entirety of the smart battery chargers (288, 289) moves to near the connection head, it may also be possible to share a common smart battery charger (288, 289) for a plurality pairs of connection heads.

Figure 7:
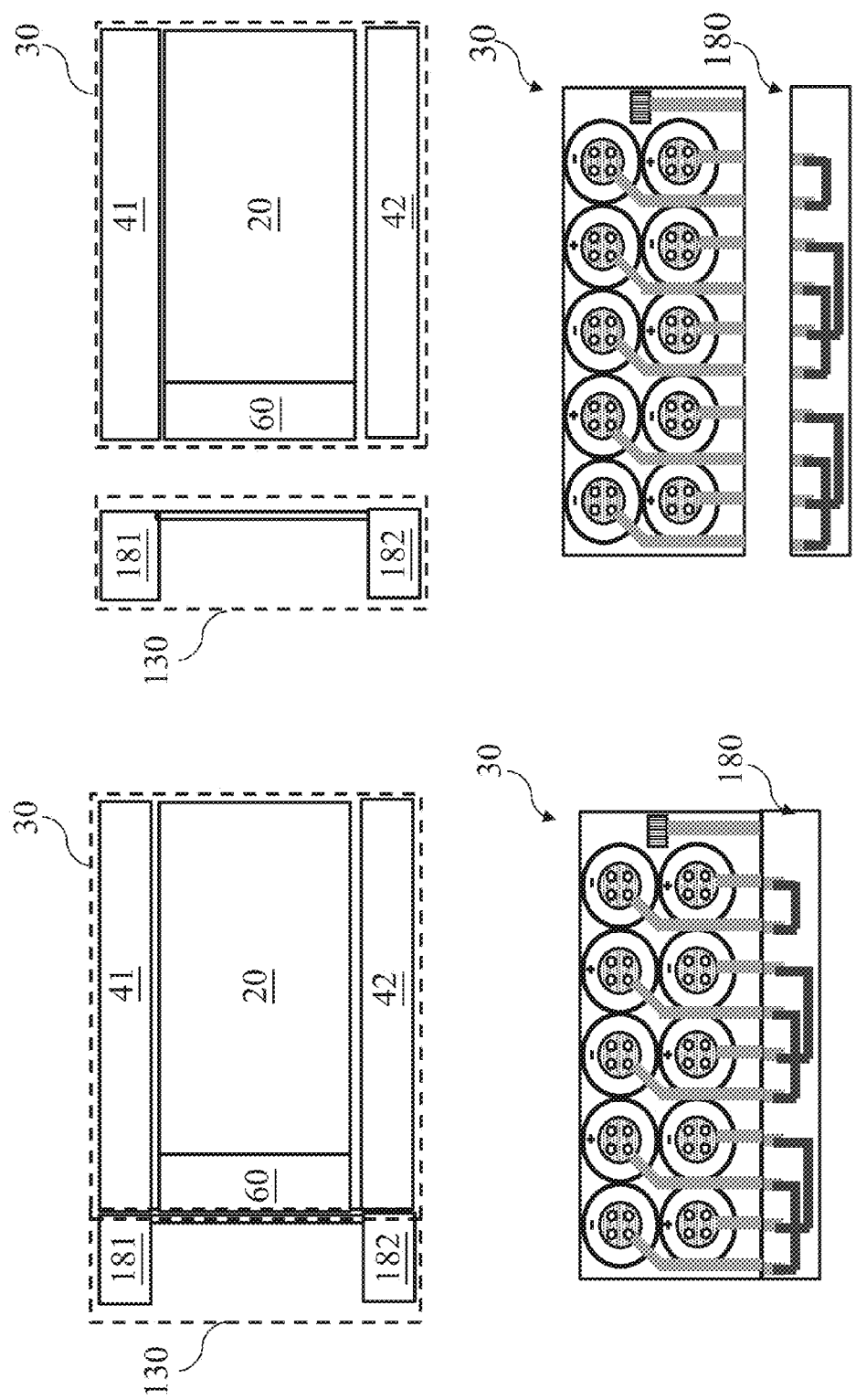
FIG. 7 is a schematic diagram of still another embodied aspect of the safety-critical smart battery management system with the capability of charging single battery cells and discharging battery pack according to the present invention.

As shown in FIG. 7, a schematic diagram of still another embodied aspect of the safety-critical smart battery management system with the capability of charging single battery cells and discharging battery pack according to the present invention is shown therein. When the cells 11 of the smart battery pack 30 are charged separately at the same time to a full length, the smart battery pack 30 are connected to the smart battery discharging module 130 to discharge. However, when the load or electronic product is its sleep mode or a shut-down state, or an emergency event occurs and thus a power has to be inactivated, the smart battery discharging module 130 disconnects a connection between the smart battery pack 30 and the smart battery discharging module 130 in a mechanical or electric manner, so that the battery cell may be avoided from a self charging and discharging and thus a fire catching and explosion, promoting a safety and reliability of the battery module.

Figure 8:
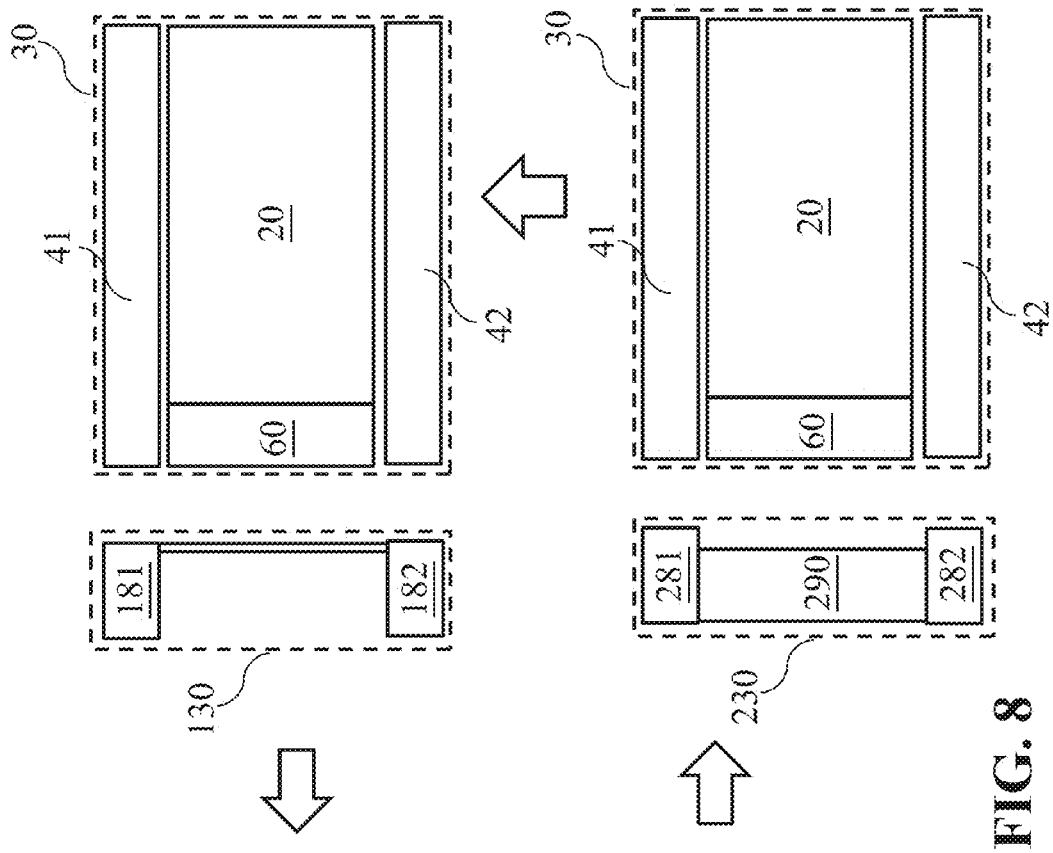
FIG. 8 is a schematic diagram of an embodied aspect of a replacement use of a smart battery discharging module with the safety-critical smart battery management system with the capability of charging single battery cells and discharging battery pack according to the present invention.
Figure 8:
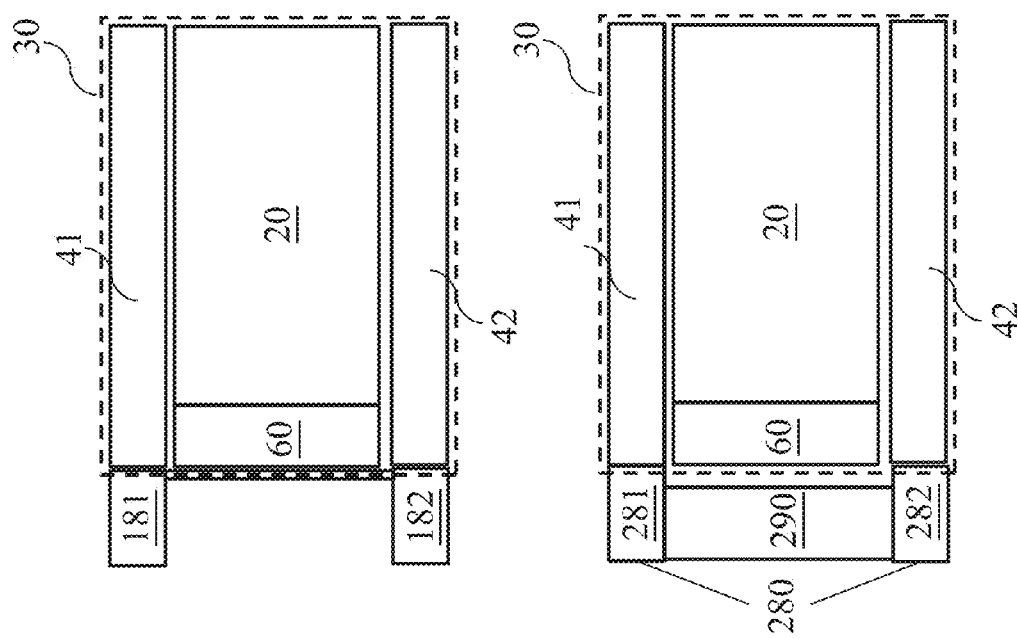

As shown in FIG. 8, a schematic diagram of an embodied aspect of a replacement use of a smart battery discharging module with the safety-critical smart battery management system with the capability of charging single battery cells and discharging battery pack according to the present invention is shown therein. When the smart battery charging module 230 individually charges each of the cells 11 in the battery group 20 to a full length, the smart battery pack 30 may be drawn out from the smart battery charging module 230, and the smart battery discharging module 130 is inserted to discharge.

In the same sense, when the smart battery pack 30 requires to be charged, the smart battery pack 30 may be drawn out from the smart battery discharging module 130, and the battery charging connection module 280 of the smart battery charging module 230 is inserted, so as to charge singly the cells 11 at the same time. Alternatively, an inverse procedure is performed. When the smart battery charging module 230 charges singly each of the cells 11 in the smart battery pack 30 to a full length, the smart battery pack 30 are electrically disconnected from the battery charging connection module 280, and the smart battery discharging module 130 is inserted to discharge. This simple architecture may promote a manufacturing efficiency and reduce a cost.

To promote the lifetime and safety of the smart battery pack 30, the monitoring control unit 60 is used to detect and predict a state of the individual battery cells 11, and thus enabling a proper protection measurement to be set forth according thereto. In addition, a measurement device and various sensors are used to detect a current, a voltage, and a temperature of the individual cells 11, which are then recorded in at least one memory (52, 53). The measured data are used to calculate a battery residual, a discharging power, and a charging power, accurately predict a healthy state, an aging state, a charging state, and a work state of the cells 11, and provide an optimal charging state and a maximum output power. In addition, the current, voltage and temperature of the individual cells 11 are detected to provide information regarding how to protect the case where an over-discharging and an over-discharging occurs, the case where an over-current and a short-circuit, and the case where an overly high temperature and an overly low temperature, so that the cells 11 are provided with a multiple of protections to promote a reliability of the battery system. To promote the charging efficiency and a battery lifetime, the monitoring control unit 60 accurately predicts the healthy state, aging state, charging state, and the work state of the cells 11, so that the smart battery chargers (288, 289) are provided with the optimal charging condition. The smart battery chargers (288, 289) comprise one or more smart battery chargers (288, 289) and the smart battery charging control unit 290. The smart battery charging control unit 290 provides a charging control policy for the smart battery chargers (288, 289) according to the detected information such as the battery charging state and battery capacity, in which the charging control policy comprises a control for a charging time, and a requirement of a battery charging waveform. A good charging control policy may increase the lifetime of the cells.

Figure 9:
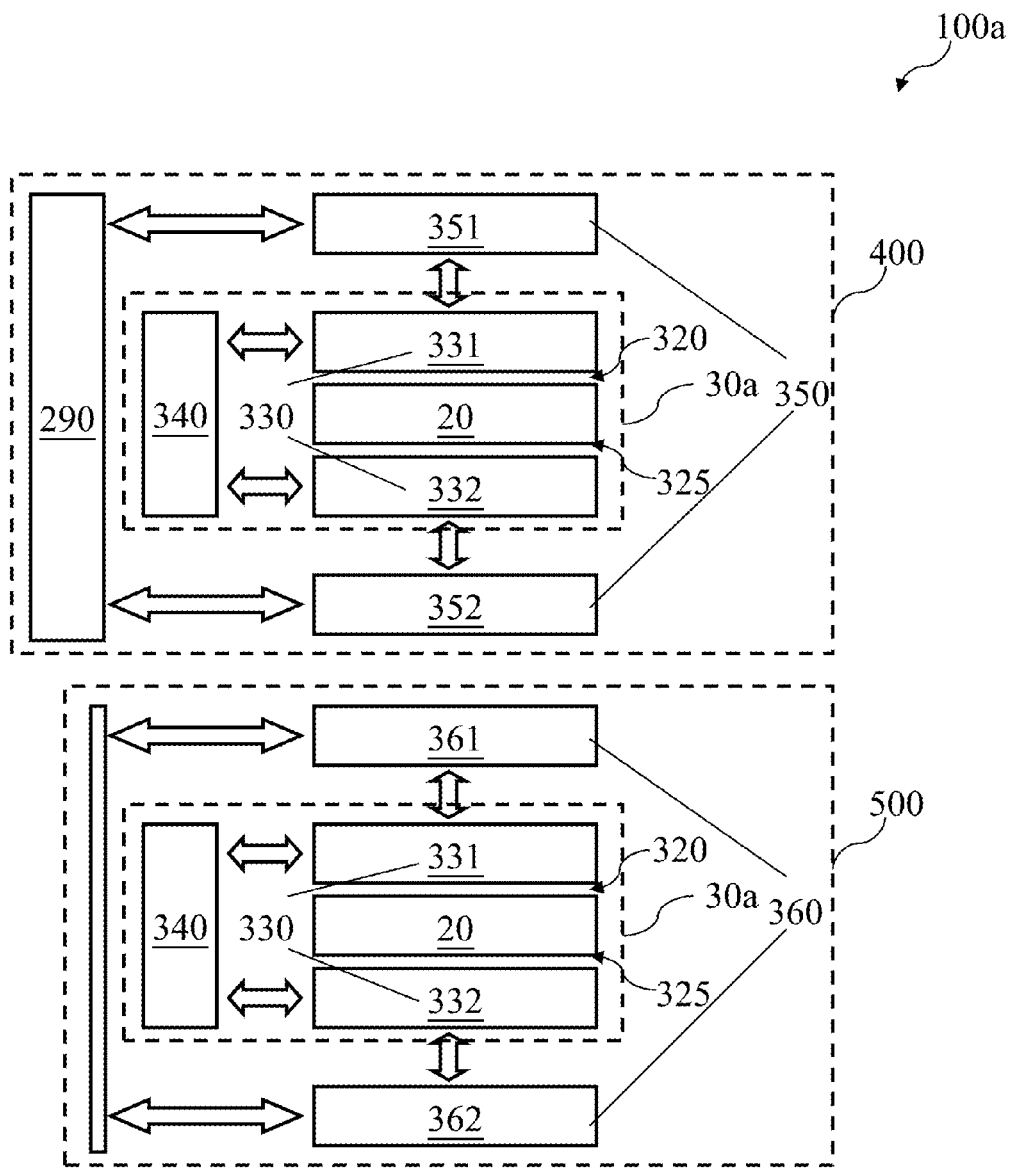
FIG. 9 is a schematic diagram of another circuit block embodiment of the safety-critical smart battery management system with the capability of charging single battery cells and discharging battery pack according to the present invention.

Thereafter, referring to FIG. 9, a schematic diagram of another circuit block embodiment of the safety-critical smart battery management system with the capability of charging single battery cells and discharging battery pack according to the present invention is shown therein.

The smart battery management system 100*a* includes a smart battery pack 30*a*, a smart battery charging module 400 and a smart battery discharging module 500. The smart battery pack 30*a* may be disposed in the smart battery charging module 400 and the smart battery discharging module 500 through a plugging manner. The smart battery pack 30*a* includes a battery group 20, a battery connection module 330 and a monitoring control unit 340.

The battery group 20 at least includes two cells without any electric connection among the cells. The battery connection module 330 is disposed above or below the battery group 20, in which the upper part is the battery connection module face A 331, while the lower part is the battery connection module face B 332. In real implementation, the battery connection module 330 uses a pair of first PCBs having a plurality of connection heads. This pair of first PCB has two portions: the battery connection module face A 331 and the battery connection module face B 332, which are electrically connected with the cells. To facilitate the description, the upper face of the battery group 20 is called as battery group face A 320, while the lower face of the battery group 20 is called the battery group face B 325. In real implementation, the battery connection module 330 may provide a plurality of contacts, so that each of the cells is connected to a monitoring/measurement device, respectively, so that a charging/discharging state and characteristics of each of the plurality of cells in the battery group 20 may be monitored and measured.

At the smart battery charging module 400, it includes the battery charging connection module 350 and the smart battery charging control unit 290. The battery charging connection module 350 is a pair of second PCBs having a plurality of connection heads. This second pair of PCBs is the battery charging connection module face A 351 and the battery charging connection module face B 352, which are electrically connected to the battery connection module face A 331 and the battery connection module face B 332, so that each of the connection heads is connected to the positive and negative electrodes of each of the batter cores.

At the smart battery discharging module 500, it comprises a battery discharging connection module 360. The battery discharging connection module 360 is electrically connected to the battery discharging connection module face A 361 and the battery discharging connection module face B 362 through the battery discharging connection module face A 361 and the battery discharging connection module face B 362.

Figure 10:
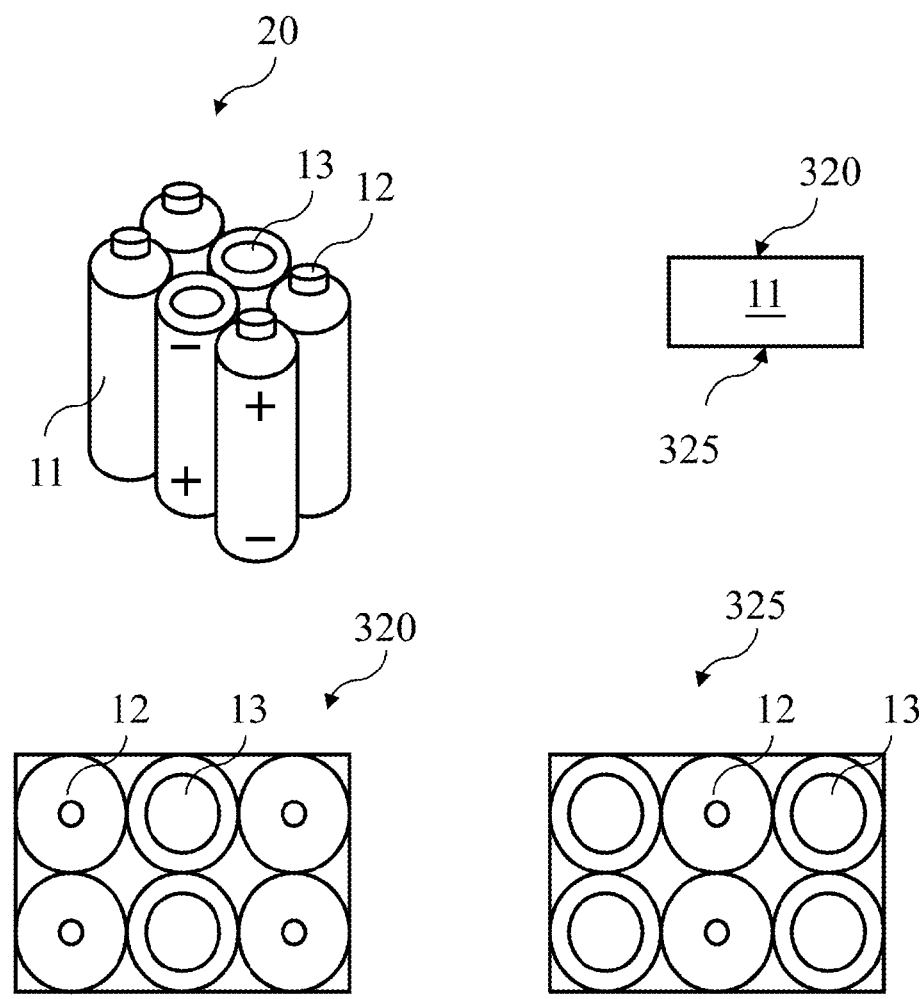
FIG. 10 is a schematic diagram of an embodied aspect of a battery group of the safety-critical smart battery management system with the capability of charging single battery cells and discharging battery pack according to the present invention.

As shown in FIG. 10, a schematic diagram of an embodied aspect of a battery group of the safety-critical smart battery management system with the capability of charging single battery cells and discharging battery pack according to the present invention is shown therein. The battery group 20 comprises a plurality of cells 11, each having no any connection with one another. The cells 11 have theirs arrangement associated with theirs discharging application. Some cells 11 face upwards with its positive electrodes, while some other cells 11 with its negative electrodes. In this example, above or the battery group face A 320, the middle two cells 11 face upwards with their negative electrodes 13, and the other cells 11 with their positive electrodes 12. On the contrary, In this example, below or the battery group face B 325, the middle two cells 11 face downwards with their positive electrodes, while the other cells 11 face downwards with their negative electrodes 13.

Figure 11:
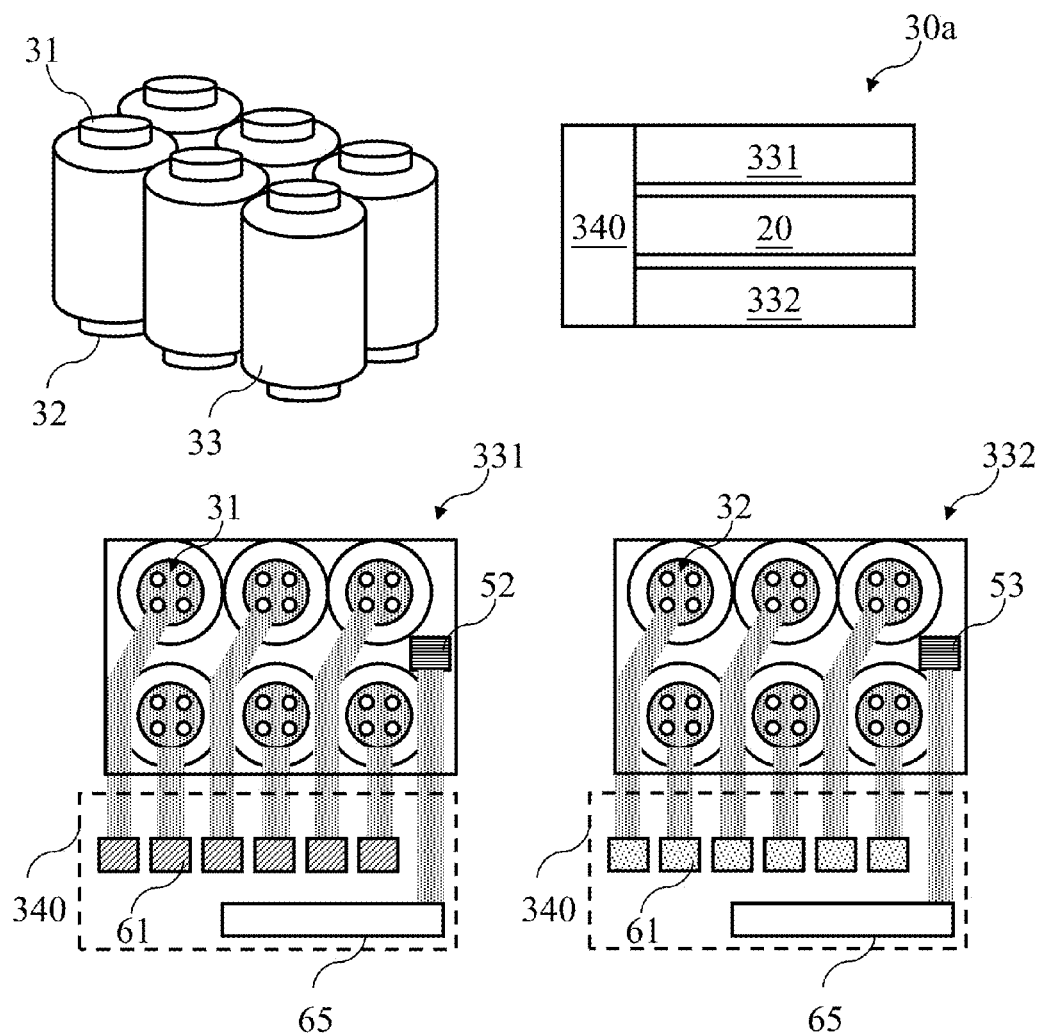
FIG. 11 is a schematic diagram of another embodied aspect of the battery group of the safety-critical smart battery management system with the capability of charging single battery cells and discharging battery pack according to the present invention.

As shown in FIG. 11, a schematic diagram of another embodied aspect of the battery group of the safety-critical smart battery management system with the capability of charging single battery cells and discharging battery pack according to the present invention is shown therein. The smart battery pack 30a comprises a plurality of cells 33 having connection heads, and each of the cells 33 includes a battery core 11 and connection heads (31, 32), which may also be called as contacts and may be implemented by a PCB having a suitable form and material, such as a copper baseboard, a soft PCB, or a soft/hard composite board.

In the battery group 20, at positions corresponding to each of the cells 11, a connection head 31 is added to have the battery connection module face A 331. Similarly, at positions corresponding to each of the cells 11 in the battery group 20, a connection head 32 is added to have the battery connection module face B 332. Therefore, the smart battery pack 30a includes a battery group 20, a battery connection module 330 (having the battery connection module face A 331 and the battery connection module face B 332) and a monitoring control unit 340. The battery connection module face A 331 and the battery connection module face B 332 are connected to the battery group face A 320 and the battery group face B 325 in the battery group 20, respectively. The PCB may comprises the connection heads (or called as contacts) of the cells and electric connection pins which are wired to an edge of the PCB, so that they may be electrically connected to a monitoring/measurement device 61 at the monitoring control unit 340.

Each pair of connection heads at the battery connection module face A 331 and the battery connection module face B 332 are connected to two ends of a monitoring/measurement device 61, respectively. It may also be possible to share a common monitoring/measurement device 61 for a plurality pairs of connection heads. In the monitoring control unit 340, the monitoring/measurement device 61 may also be partially or entirely be moved to the connection heads of the PCB near the battery connection module face A 331 or the battery connection module face B 332, so as to reduce a signal interference, thereby promoting a measurement accuracy. When a partiality or entirety of the monitoring/measurement device 61 is moved to near the connection heads, it may also be possible to share a common monitoring/measurement device 61 for a plurality pairs of connection heads. In addition, one or more memories may also be added at the battery connection module face A 331, such as the memory 52, or at the battery connection module face B 332, such as the memory 53. Or, memories may be simultaneously added at face A and face B, so as to record an identification and characteristics specifications, a monitored/measured data in the course of charging and discharging, conditions for reaching an optimal charging and discharging, etc, thereby forming a smart battery pack 30a. The data stored in the memory (52, 53) of the smart battery pack 30a provides the smart battery charging module 400 and the smart battery discharging module 500 to effectively charge and discharge. In addition, since the memories (52, 53) is included in the smart battery pack 30a, any smart battery charging module 400 may be used to charge. That is, a smart battery charging module 400 may be used with one or more smart battery pack 30a, so as to save the requirement of chargers.

Figure 12:
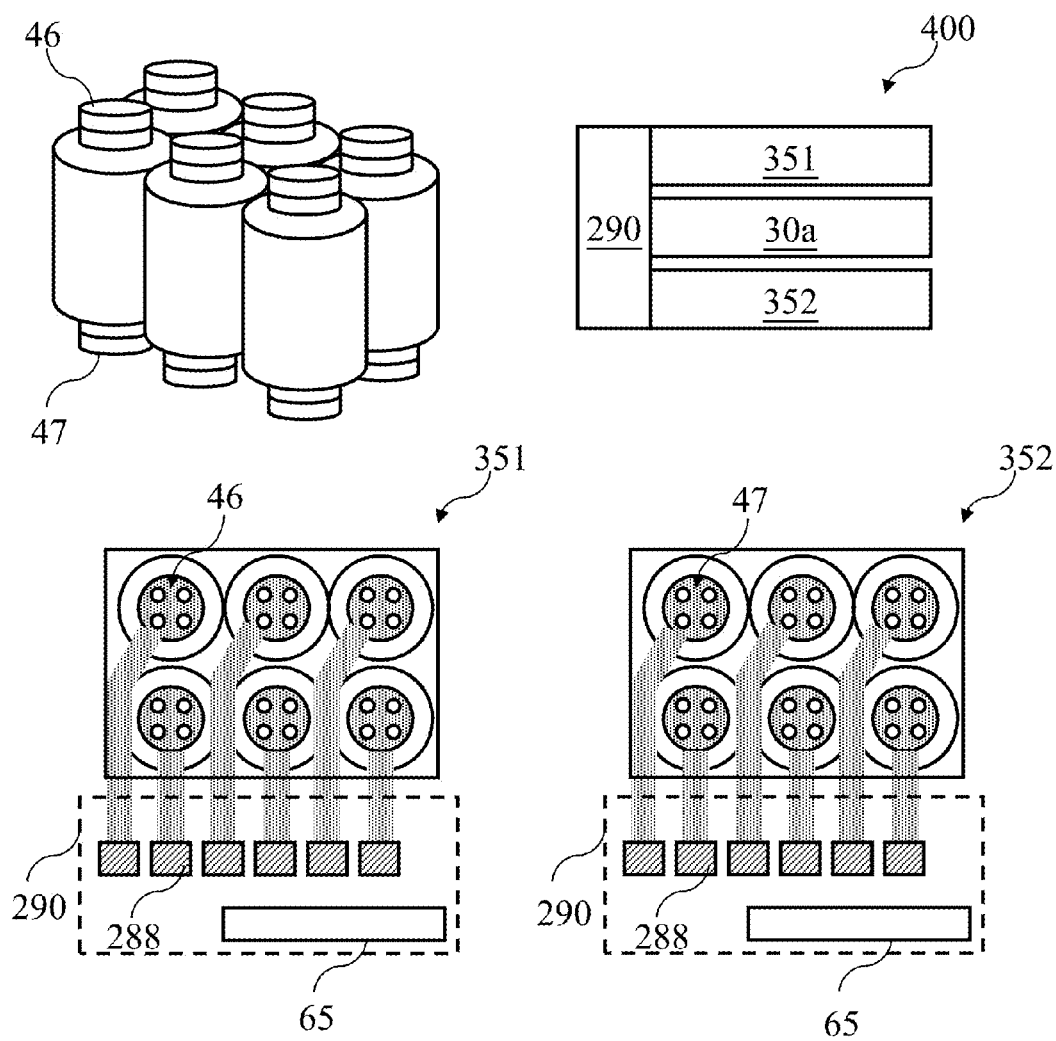
FIG. 12 is a schematic diagram of another embodied aspect of the smart battery charging module of the safety-critical smart battery management system with the capability of charging single battery cells and discharging battery pack according to the present invention.

As shown in FIG. 12, a schematic diagram of another embodied aspect of the smart battery charging module of the safety-critical smart battery management system with the capability of charging single battery cells and discharging battery pack according to the present invention is shown therein. In the course of battery charging, the battery connection module face A 331 and the battery charging connection module face B 352 are connected to a smart battery pack 30a, to form a smart battery charging module 400. Referring concurrently to FIG. 11 and FIG. 12, it may be known that the smart battery charging module 400 has a similar architecture as compared to the smart battery pack 30a.

An respective connection head (46, 47) is added at the battery charging connection module face A 351 and the battery charging connection module face B 352, and connected to the connection heads (31, 32) at positions corresponding to the battery connection module face A 331 and the battery connection module face B 332, respectively. In real implementation, the battery connection module face A 351 may be a PCB, including connection heads 46 and connection wires, to connect to the smart battery charger 288 of the smart battery charging control unit 290 to charge a single battery. The battery charging connection module face B 352 may also be implemented in the same manner. That is, each pair of connection heads (46, 47) at the battery charging connection module face A 351 and the battery charging connection module face B 352 are connected to two ends of the smart battery charger 288. It may also be possible to share a common smart battery charger 288 for a plurality of connection heads. In implementation, a partiality or entirety of the smart battery charger 288 may also be moved to the connection head of the PCB near the battery connection module face A 331 or the battery connection module face B 332, so as to reduce a connection resistance issue, promoting a charging efficiency. When a partiality or entirety of the smart battery charger 288 is moved to the connection head of the PCB, it may also be possible to share a common smart battery charger 288 for a plurality of connection heads. The smart battery charging control unit 290 not only includes the smart battery charger 288, but also a control circuit 65.

Figure 13:
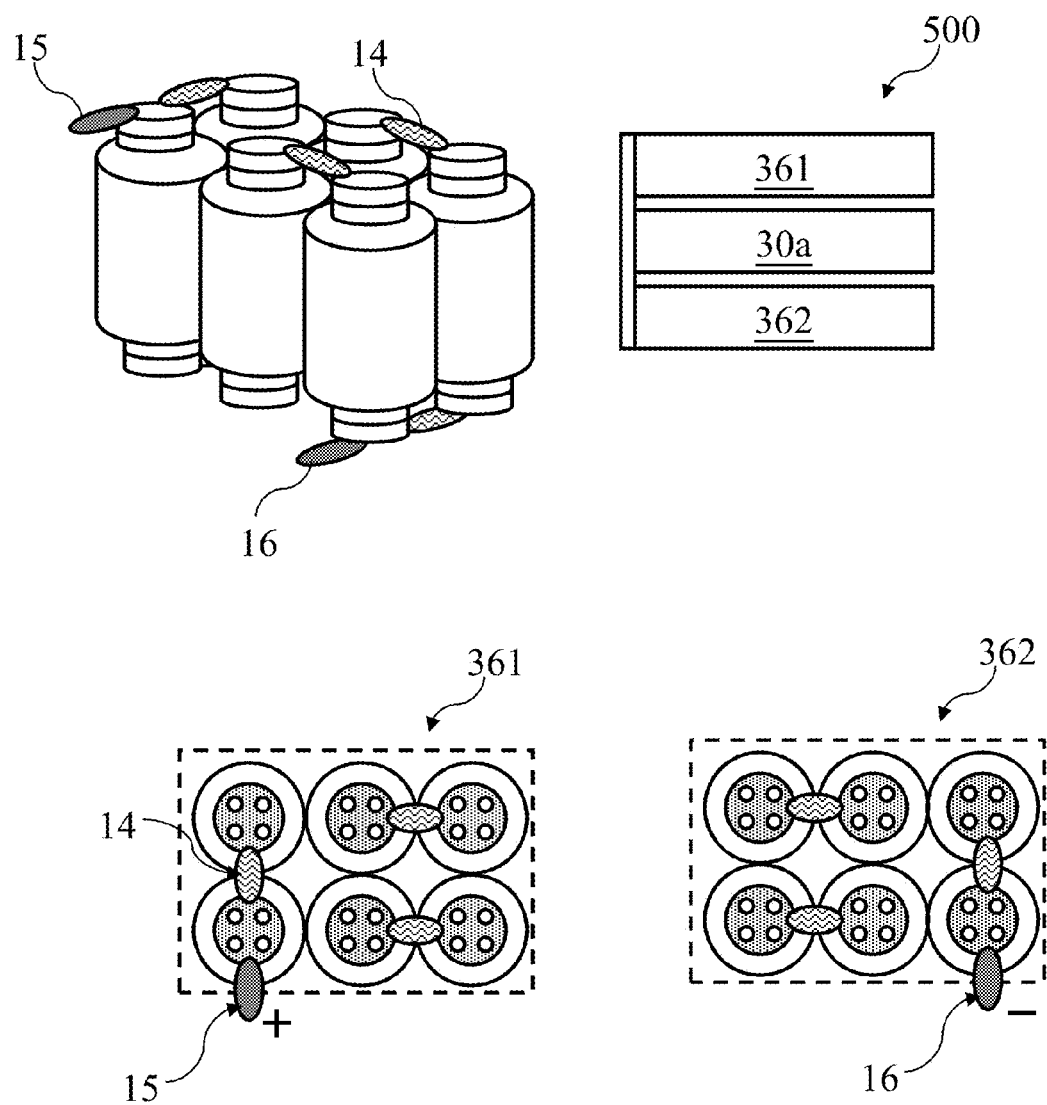
FIG. 13 is a schematic diagram of yet another embodied aspect of the smart battery discharging module of the safety-critical smart battery management system with the capability of charging single battery cells and discharging battery pack according to the present invention.

As shown in FIG. 13, a schematic diagram of yet another embodied aspect of the smart battery discharging module of the safety-critical smart battery management system with the capability of charging single battery cells and discharging battery pack according to the present invention is shown therein. In the course of battery discharging, the battery discharging connection module face A 361 and the battery discharging connection module face B 362 are connected to a smart battery pack 30a, to form a smart battery discharging module 500.

According to the arrangement and the requirement of discharging application, a connection sheet 14 is used to connect adjacent cells. In this example, according to the arrangement of the battery group 20 in FIG. 4 and the requirement of the "three in-series two in-parallel" battery cells, at the battery discharging connection module face A 361 and the battery discharging connection module face B 362 are each implemented by three connection sheets 14.

At the battery discharging connection module face A 361, the pin 15 is connected to a power source, while at the battery discharging connection module face B 362 the pin 16 is connected to a ground wire. The smart battery discharging module 500 has a similar discharging function as compared to the prior art battery cell. However, the smart battery discharging module 500 is combined with the smart battery pack 30a, possessing a smart monitoring and measurement function, thereby promoting the overall energy source efficiency of the smart battery pack 30a.

Figure 14:
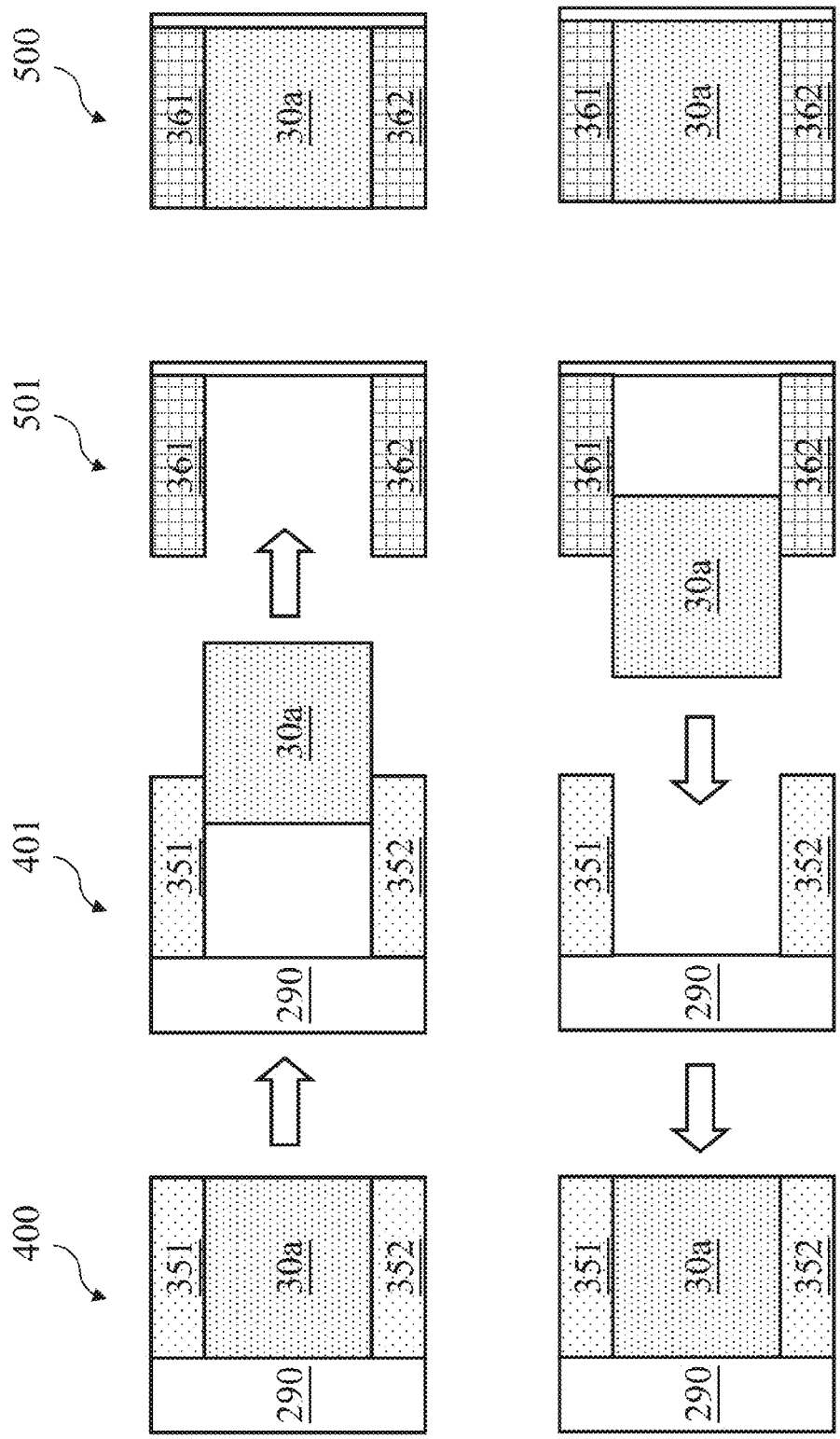
FIG. 14 is a schematic diagram of still another embodied aspect of the smart battery charging module and the smart battery discharging module of the safety-critical smart battery management system with the capability of charging single battery cells and discharging battery pack according to the present invention.

Referring to FIG. 14, in which a schematic diagram of still another embodied aspect of the smart battery charging module and the smart battery discharging module of the safety-critical smart battery management system with the capability of charging single battery cells and discharging battery pack according to the present invention is shown therein. When the smart battery charging module 400 charges all the individual cells in the battery group 20 to a full length, the smart battery pack 30a may be drawn out from the smart battery charging module 400, and inserted in to a smart battery discharging module case 501, so that it becomes that the smart battery discharging module 500 discharges the smart battery pack 30a. In a similar sense, when the smart battery pack 30a has to be charged, the smart battery pack 30a may be drawn out from the smart battery discharging module 500 and inserted into the smart battery charging module case 401, so that it becomes that the smart battery charging module 400 separately charges singly the individual cells 11 in the smart battery pack 30a. Alternatively, after the smart battery charging module 400 charges singly all the individual cells 11 to a full length, the smart battery charging control unit 290 and the battery charging connection module 350, i.e. the battery charging connection module face A 351 and the battery charging connection module face B 352, are removed from the smart battery charging module 400. Then, the battery discharging connection module 360 is connected, i.e. the battery discharging connection module face A 361 and battery discharging connection module face B 362, to form the smart battery discharging module 500 to let the battery cells therein discharge. In a similar sense, the smart battery pack 30a of the smart battery discharging module 500 may be used to form the smart battery discharging module 500 in an inversed process, to charge the individual cells. This simple architecture may promote a manufacturing efficiency and reduce a cost.

It is to be additionally pointed out that the monitoring control unit 340 is used for detecting and predicting a state of the individual cells 11, and thus enabling a proper protection measurement to be set forth according thereto, for the purpose of promoting the lifetime and safety of the smart battery pack 30a. In addition, a measurement device and various sensors are used to detect a current, a voltage, and a temperature of the individual cells 11, which are then recorded in at least one memory (52, 53). The measured data are used to calculate a battery residual, a discharging power, and a charging power, accurately predict a healthy state, an aging state, a charging state, and a work state of the cells, and provide an optimal charging state and a maximum output power. In addition, the current, voltage and temperature of the individual cells 11 are detected to provide information regarding how to protect the case where an over-discharging and an over-discharging occurs, the case where an over-current and a short-circuit, and the case where an overly high temperature and an overly low temperature, so that the cells 11 are provided with a multiple of protections to promote a reliability of the battery system.

To promote the charging efficiency and a battery lifetime, the monitoring control unit 340 accurately predicts the healthy state, aging state, charging state, and the work state of the cells 11, so that the smart battery charging control unit 290 is provided with the optimal charging condition. The smart battery charging control unit 290 comprises one or more smart battery chargers 288 and the control circuit 65. The control circuit 65 provides a charging control policy for the smart battery chargers 288 according to the detected information such as the battery charging state and battery capacity, in which the charging control policy comprises a control for a charging time, and a requirement of a battery charging waveform. A good charging control policy may increase the lifetime of the cells.

In view of the above, the present invention has the difference as compared to the prior art that each of the cells in the battery group is monitored and measured for its charging and discharging state and characteristics, and the electric connection between the battery connection module and the cells is controlled based on the obtained charging and discharging state and characteristics, so that the cells in the battery group are singly charged or discharged at the same time. Further, the automatic disconnection mechanism working between the battery module and the battery discharging module may effectively avoid from a self charging and discharging of the battery pack, which successively catches fire and explodes, promoting the safety of the battery module.

By using of this technical means, the issue encountered in the prior art may be solved, thereby achieving the technical efficacy of a promoted charging efficiency, an increased overall energy efficiency, and an enhanced battery core lifetime.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A safety-critical smart battery management system with the capability of charging single battery cells and discharging battery pack, comprising:
   a smart battery pack, comprising:
      a battery group, comprising a plurality of cells, exempting from any electrical connection thereamong;
      a battery connection module, simultaneously arranged at a first side and a second side or one of the first and second sides, and having a plurality of pins exempting from a conduction to one another and electrically connected to a positive electrode and a negative electrode; and
      a monitoring control unit, monitoring and measuring a charging and discharging state and characteristics of the plurality of cells in the battery group;
   a smart battery charging module, comprising:
      a battery charging connection module, electrically connected to or disconnected to the plurality of pins of the battery connection module through a plugging manner, and enabling the plurality of cells in the battery group to connect to one another in series-parallel when electrically connected to the plurality of pins of the battery connection module; and a smart battery charging control unit, electrically connected to the battery charging connection module, and charging each single one of the plurality of cells in the battery group; and a smart battery discharging module, electrically connected to or disconnected to the plurality of pins of the battery connection module through a plugging manner, enabling the plurality of cells in the battery group to connect to one another in series-parallel and discharge when electrically connected to the plurality of pins of the battery connection module, and automatically disconnecting the electrical connection between the smart battery discharging module and the plurality of pins when a load is stopped in use.

2. The safety-critical smart battery management system with the capability of charging single battery cells and discharging battery pack as claimed in claim 1, wherein each of the plurality of pins has a first end and a second end, each being a connection head and electrically directly connected to the positive and negative electrodes of each of the plurality of cells and arranged an edge side of a printed circuit board (PCB), respectively.

3. The safety-critical smart battery management system with the capability of charging single battery cells and discharging battery pack as claimed in claim 1, wherein the battery connection module further comprises at last a memory for storing an identification and a characteristics specification, a monitoring/measurement data during a charging and discharging period, and an optimum charging and discharging condition.

4. The safety-critical smart battery management system with the capability of charging single battery cells and discharging battery pack as claimed in claim 3, wherein the monitoring unit comprises a plurality of monitoring pins, at least a monitoring/measurement device and a control circuit, each of the plurality of monitoring pins being electrically connected to the plurality of pins at the first end thereof and electrically connected to the monitoring/measurement device at the second end, and the control circuit being used for control the memory.

5. The safety-critical smart battery management system with the capability of charging single battery cells and discharging battery pack as claimed in claim 4, wherein the monitoring/measurement device is entirely or partially disposed at one or ones of the plurality of pins nearby the monitoring/measurement device.

6. The safety-critical smart battery management system with the capability of charging single battery cells and discharging battery pack as claimed in claim 1, wherein the battery connection module, the battery charging connection module, and the smart battery discharging module are each a printed circuit board (PCB), the PCB having a plurality of electric connection pins for a combination among the battery connection module, the battery charging connection module, and the smart battery discharging module.

7. The safety-critical smart battery management system with the capability of charging single battery cells and discharging battery pack as claimed in claim 6, wherein the PCB includes a copper baseboard, a soft PCB, and a soft and hard composite baseboard.

8. The safety-critical smart battery management system with the capability of charging single battery cells and discharging battery pack as claimed in claim 1, wherein the smart battery charging control unit charges each single one of the plurality of cells through at least a smart battery charger.

9. The safety-critical smart battery management system with the capability of charging single battery cells and discharging battery pack as claimed in claim 8, wherein the smart battery chargers are partially or entirely disposed at a position adjacent to an electric connection point between the battery connection module and the battery charging connection module.

10. The safety-critical smart battery management system with the capability of charging single battery cells and discharging battery pack as claimed in claim 1, wherein the smart battery discharging module is electrically disconnected automatically in a mechanical or electrical manner.

11. The safety-critical smart battery management system with the capability of charging single battery cells and discharging battery pack as claimed in claim 1, wherein the plurality of pins of the smart battery discharging module each have a routing controlled by one of an electric welding and a switch.

12. A safety-critical smart battery management system with the capability of charging single battery cells and discharging battery pack, comprising:
  a smart battery pack, comprising:
    a battery group, comprising a plurality of cells, exempting from any electrical connection thereamong;
    a battery connection module, simultaneously arranged above or below the battery group to electrically connect the battery; and
    a monitoring control unit, monitoring and measuring a charging and discharging state and characteristics of the plurality of cells in the battery group;
  a smart battery charging module, comprising:
    a battery charging connection module, electrically connected to or disconnected to the plurality of pins of the battery connection module through a plugging manner, and enabling the plurality of cells in the battery group to connect to one another in series-parallel when electrically connected to the plurality of pins of the battery connection module; and
    a smart battery charging control unit, electrically connected to the battery charging connection module, and charging each single one of the plurality of cells in the battery group; and
  a smart battery discharging module, comprising:
    a battery discharging connection module, electrically connected to or disconnected to the battery connection module through a plugging manner and discharging the plurality of cells in the battery group in series-parallel when electrically connected to the battery connection module.

13. The safety-critical smart battery management system with the capability of charging single battery cells and discharging battery pack as claimed in claim 12, wherein the electric connection is achieved by one or all of a connection head, a connection sheet, and a connection wire.

14. The safety-critical smart battery management system with the capability of charging single battery cells and discharging battery pack as claimed in claim 12, wherein the smart battery pack further comprises at last a memory for storing an identification and a characteristics specification, a monitoring/measurement data during a charging and discharging period, and an optimum charging and discharging condition.

15. The safety-critical smart battery management system with the capability of charging single battery cells and discharging battery pack as claimed in claim 12, wherein the battery connection module provides a plurality of contacts to enable each of the plurality of cells to connect to a monitoring/measurement device.

16. The safety-critical smart battery management system with the capability of charging single battery cells and discharging battery pack as claimed in claim 12, wherein the battery connection module is a pair of printed circuit boards (PCBs) having a plurality of connection heads disposed above or below the battery group, respectively, each of the plurality of connection heads being electrically connected to a positive electrode and a negative electrode of each of the plurality of cells.

17. The safety-critical smart battery management system with the capability of charging single battery cells and discharging battery pack as claimed in claim 16, wherein the pair of PCBs includes a copper baseboard, a soft PCB, and a soft and hard composite baseboard, and has a plurality of electric connection pins.

18. The safety-critical smart battery management system with the capability of charging single battery cells and discharging battery pack as claimed in claim 12, wherein the battery charging connection module and the battery discharging connection module are both a pair of second PCBs having a plurality of connection heads, and enable each of the plurality of connection heads to be indirectly connected to the positive and negative electrodes of each of the plurality of cells, the pair of second PCBs includes a copper baseboard, a soft PCB, and a soft and hard composite baseboard and having a plurality of electric connection pins.

19. The safety-critical smart battery management system with the capability of charging single battery cells and discharging battery pack as claimed in claim 12, wherein the smart battery charging control unit charges each single one of the plurality of cells through at least a smart battery charger.

20. The safety-critical smart battery management system with the capability of charging single battery cells and discharging battery pack as claimed in claim 19, wherein the smart battery chargers are partially or entirely disposed at a position adjacent to an electric connection point between the battery connection module and the battery charging connection module to reduce a resistance.

* * * * *